United States Patent
Niu et al.

(10) Patent No.: US 9,495,987 B1
(45) Date of Patent: Nov. 15, 2016

(54) NOISE MITIGATION FOR WRITE PRECOMPENSATION TUNING

(71) Applicant: Seagate Technology LLC, Cupertino, CA (US)

(72) Inventors: Ben Niu, Singapore (SG); Lan Xia, Singapore (SG); Fong Kheon Chong, Singapore (SG); Quek Leong Choo, Singapore (SG); Song Wee Teo, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/701,914

(22) Filed: May 1, 2015

(51) Int. Cl.
G11B 5/09 (2006.01)
G11B 5/596 (2006.01)
G11B 20/12 (2006.01)

(52) U.S. Cl.
CPC ............ *G11B 5/59627* (2013.01); *G11B 5/09* (2013.01); *G11B 5/59688* (2013.01); *G11B 2020/1238* (2013.01)

(58) Field of Classification Search
None
See application file for complete search history.

(56) References Cited

U.S. PATENT DOCUMENTS

| | | | | |
|---|---|---|---|---|
| 4,612,586 A * | 9/1986 | Sordello | G11B 20/182 | 360/25 |
| 4,698,523 A * | 10/1987 | Gershon | G11B 5/59611 | 327/61 |
| 4,831,470 A * | 5/1989 | Brunnett | G11B 21/106 | 360/75 |
| 4,968,985 A * | 11/1990 | Riggle | G11B 20/10037 | 341/106 |
| 5,012,363 A * | 4/1991 | Mine | G11B 21/106 | 360/77.05 |
| 5,170,299 A * | 12/1992 | Moon | G11B 5/59655 | 360/51 |
| 5,818,667 A * | 10/1998 | Larson | G11B 5/4846 | 360/264.2 |
| 6,937,420 B1 * | 8/2005 | McNab | G11B 5/59627 | 360/75 |
| 2003/0002190 A1 * | 1/2003 | Teo | G11B 20/10009 | 360/63 |
| 2004/0212361 A1 * | 10/2004 | Chong | G11B 27/36 | 324/210 |
| 2008/0144210 A1 * | 6/2008 | Dougherty | G11B 5/59644 | 360/77.02 |
| 2012/0275278 A1 * | 11/2012 | Wilson | G11B 5/02 | 369/13.24 |
| 2012/0275279 A1 * | 11/2012 | Wilson | G11B 5/02 | 369/13.24 |
| 2012/0278679 A1 * | 11/2012 | Rub | G11B 20/1833 | 714/755 |

* cited by examiner

Primary Examiner — Peter Vincent Agustin
(74) Attorney, Agent, or Firm — HolzerIPLaw, PC

(57) ABSTRACT

The disclosed technology provides techniques for mitigating write-to-write bit error rate fluctuations that decrease accuracy of write precompensation (WPC) tuning. According to one implementation, such write-to-write bit error rate fluctuations are mitigated if a predetermined pattern is written at a particular radial offset from a target data track prior to testing a WPC register in association with the target data track. Selection of the particular radial offset can be performed according to an iterative offset track clean-up disclosed herein.

20 Claims, 6 Drawing Sheets

NOISE MITIGATION FOR WRITE PRECOMPENSATION TUNING

BACKGROUND

Read/write channels in continuous media recording systems provide write precompensation to shift timing of individual write current transitions to compensate for shifts of the corresponding magnetic transitions in the recording medium that are caused by demagnetizing fields. The demagnetizing fields correspond to the particular data bits that are being recorded, and the channel maintains a short history of the data bits in, for example, a shift register. The channel uses the data contained in the shift register (e.g., a write precompensation register) to determine precompensation values that the channel applies to shift respective write current transitions before they are written to the media. The shifts in the recording media that are caused by associated demagnetizing fields then result in more evenly spaced magnetic transitions in the media.

SUMMARY

Implementations described and claimed herein provide techniques for mitigating write-to-write bit error rate fluctuations that decrease accuracy of write precompensation tuning. According to one implementation, a predetermined pattern is written at different radial offsets from a target data track in a data storage device to identify a radial offset where a data write of the predetermined pattern provides substantially highest mitigation of fluctuation in a bit error rate for subsequent data writes to the target data track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
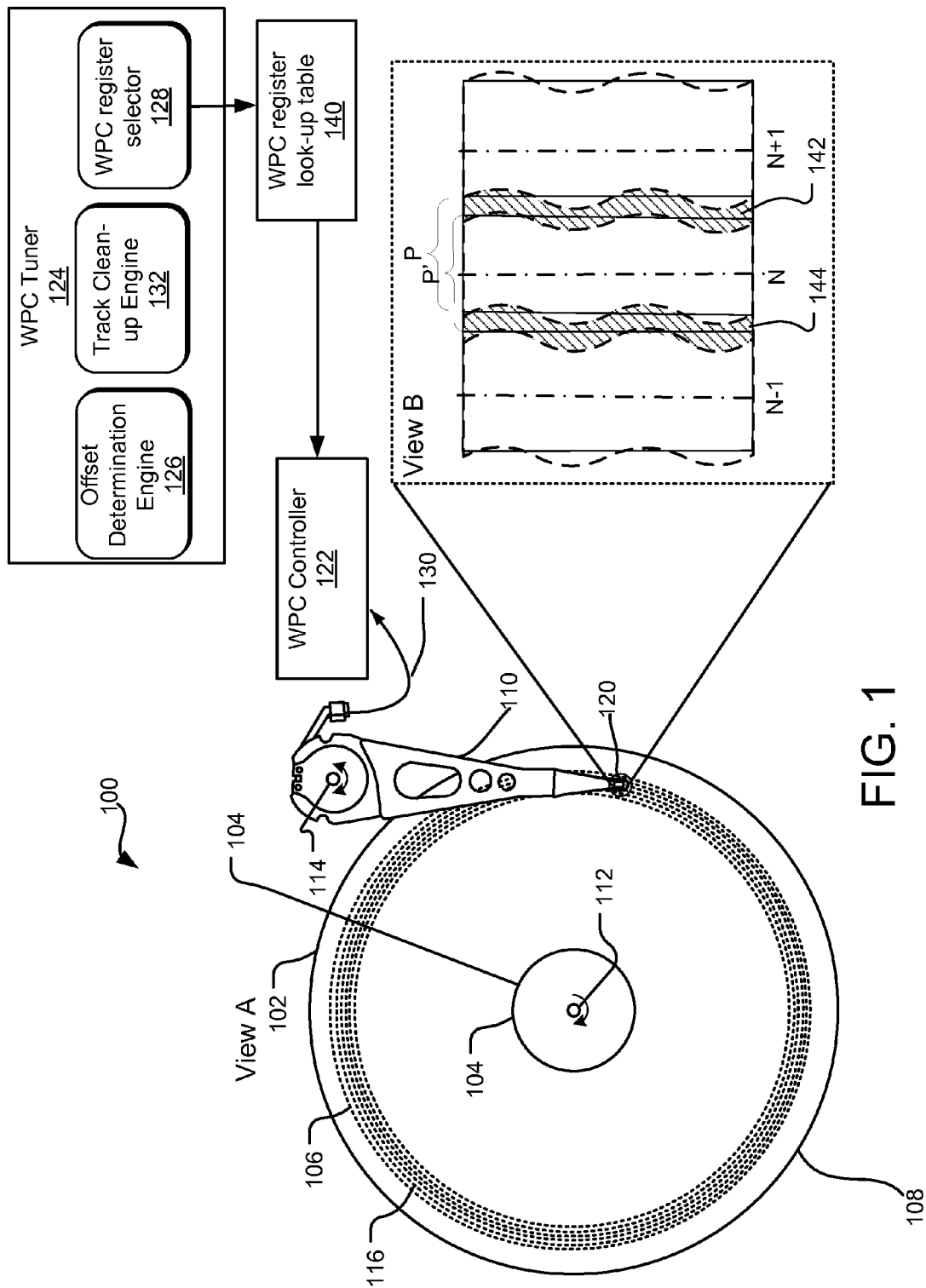
FIG. 1 illustrates an example data storage device including a transducer head assembly for writing data on a magnetic storage medium.

FIG. 1 illustrates an example data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (not shown) and from which data bits can be read using a magnetoresistive element (not shown). As illustrated in View A, the magnetic storage medium 108 rotates about a spindle center or a disc axis of rotation 112 during rotation, and includes an inner diameter 104 and an outer diameter 102 between which are a number of concentric data tracks 116. Information may be written to and read from data bit locations in the data tracks on the magnetic storage medium 108.

The transducer head assembly 120 is mounted on an actuator assembly 110 at an end distal to an actuator axis of rotation 114. The transducer head assembly 120 flies in close proximity above the surface of the magnetic storage medium 108 during disc rotation. The actuator assembly 110 rotates during a seek operation about the actuator axis of rotation 112. The seek operation positions the transducer head assembly 120 over a target data track for read and write operations.

As the transducer head assembly 120 passes over the fixed data bits of the rotating magnetic storage medium 108, a write pole (not shown) on the transducer head assembly 120 emits a series of magnetic pulses each of sufficient magnitude to perform a write transition that changes a magnetic state of an underlying region of magnetic material (e.g., a magnetized "data bit"). In some situations, demagnetizing fields can cause an unequal distribution of magnetized bits on the magnetic storage medium 108, even when corresponding write transitions (e.g., magnetic pulses) are evenly spaced in time. Unevenly spaced magnetized bits may lead to an increase in an observed number of read errors when data is read back from the device. Therefore, a technique known as write precompensation (WPC) allows for a calculated, pattern-dependent time shift of each write transition to improve a distribution of magnetized data bits on the magnetic storage medium 108.

A WPC controller 122 of the data storage device 100 retrieves and implements a timing shift for each write transition of the transducer head assembly 120. When the timing shifts (also referred to herein as "WPC values") are accurately calculated, implementation of the timing shifts decreases a resulting bit error rate for data writes to the magnetic storage medium 108.

To retrieve applicable timing shifts for each transition, the WPC controller 122 accesses one or more WPC registers (not shown). According to one implementation, each WPC register stores a number of values used to calculate pattern-dependent timing shifts. For example, a 16-bit register may assign 6 bits for a first data pattern and other bits to one or more additional data patterns. In this case, a WPC value for the first data pattern could be from 0 to 63, corresponding to physical timing range from 0 to +/−63/128 of 1 time base generator (TBG). Each register may store one or more data patterns and implement timing shifts via calculations that vary for different read channel designs.

Before execution of each write transition or grouping of write transitions (e.g., an n-bit pattern), the WPC controller 122 selects from one or more available WPC registers of the data storage device 100. For example, the WPC controller 122 accesses a WPC register look-up table 140 to determine which of a number of independently-selectable WPC registers to use to calculate pattern-dependent timing shifts for execution of a data write of a particular data pattern.

In some implementations, the WPC controller 122 applies a 2-bit "look-back" technique to determine a timing shift to apply to a 3-bit data pattern. For example, the system may record a two most-recently observed data bits in the write channel and observe that a currently-passing data bit is '1.' In this case, available data patterns are: "00-1", "10-1", 01-1", and "11-1." The WPC controller 122 accesses the WPC register look-up table 140 to determine which register corresponds to the observed three-bit data pattern. In other implementations, the WPC controller 122 applies other techniques as such 3-bit look back, 1-bit look forward, etc. These techniques may take more comprehensive data patterns into consideration and therefore utilize more WPC registers to store individual data pattern WPC values.

In one implementation, the WPC register look-up table 140 specifies a particular WPC register for use in association with each of a number of different radial zones on the magnetic storage medium 108. Values of the WPC register look-up table 140 are populated during a process referred to herein as "WPC tuning."

Existing WPC tuning techniques have proved less effective in shingled magnetic recording (SMR) devices than in other types of storage devices. SMR devices utilize tightly packed data tracks for increased areal storage density. Due to constraints on write pole size for magnetizing each individual data bit, SMR devices may have a write pole with an effective write width larger than a defined track pitch so that a write transition affects two adjacent data tracks at once. To manage data in such as system, groupings of shingled (e.g., sequentially increasing or decreasing) data tracks are read and re-written consecutively whenever a single data cell within the group is to be modified. As explained further below, SMR systems may store excess "noise" near the boundaries of each data track. This noise complicates WPC tuning.

Referring to View B of FIG. 1, a zoomed-in portion of the magnetic storage medium 108 includes three data tracks: N−1, N, and N+1 that are written to consecutively. A data write to track N overwrites a right-most portion of the data track N−1. This write leaves behind significant remnant noise (e.g., a remnant noise region 144), which is largely attributable to variations in track misregistration (TMR) (e.g., radial positioning error in the transducer head assembly 120). Similarly, a data write to track N+1 encroaches and overwrites a right-most portion of track N, creating another region of remnant noise region 142.

Due to the remnant noise regions 144 and 142, a reader reading the data track N may detect previous write history from both of the adjacent tracks N−1 and N+1, including history from the target track itself (e.g., track N). Although both remnant noise regions 144 and 142 are detectable, a dominant noise source for data track N is the right-most remnant noise region 142 (due to the order in which data tracks are written). The magnitude of detectable noise from the remnant noise regions 142 and 144 is worsened when a ratio of reader width to writer width increases.

When WPC tuning is initially performed, incidental detection of the regions of remnant noise regions 142 and 144 can cause a large fluctuation in an observed bit error rate (BER) from one write to another. This large BER fluctuation may seriously influence accuracy of WPC register selection, causing mis-tuning and BER increase.

According to one implementation, a WPC tuner 124 performs WPC tuning for initial identification and programming of WPC registers for use in association with different storage areas (e.g., different radial zones) on the magnetic storage medium 108. The WPC tuner 124 includes an offset determination engine 126, a track clean-up engine 132, and a WPC register selector 128. The offset determination engine 126 identifies a radial offset (e.g., ΔX) from the center of a test data track for writing a data pattern to mitigate regions of remnant noise (e.g., the regions 142 and 144) during WPC tuning. This radial offset is also referred to herein as a "track clean-up write offset."

Once the radial offset is identified for the test data track N, a WPC register selector 128 tests each of a number of selectable WPC registers in association with the test data track N. The WPC register selector 128 selects a WPC register for testing, and instructs the track clean-up engine 132 to 'clean' (e.g., mitigate boundary noise on) the test data track N prior to commencing the testing of the selected WPC register. Responsive to such request, the track clean-up engine 132 writes a data pattern at the identified radial offset on both sides of the test data track N. This data write substantially eliminates the remnant noise regions 142 and 144, thereby decreasing write-to-write BER fluctuations during WPC tuning and greatly improving accuracy of WPC register selection.

Figure 2:
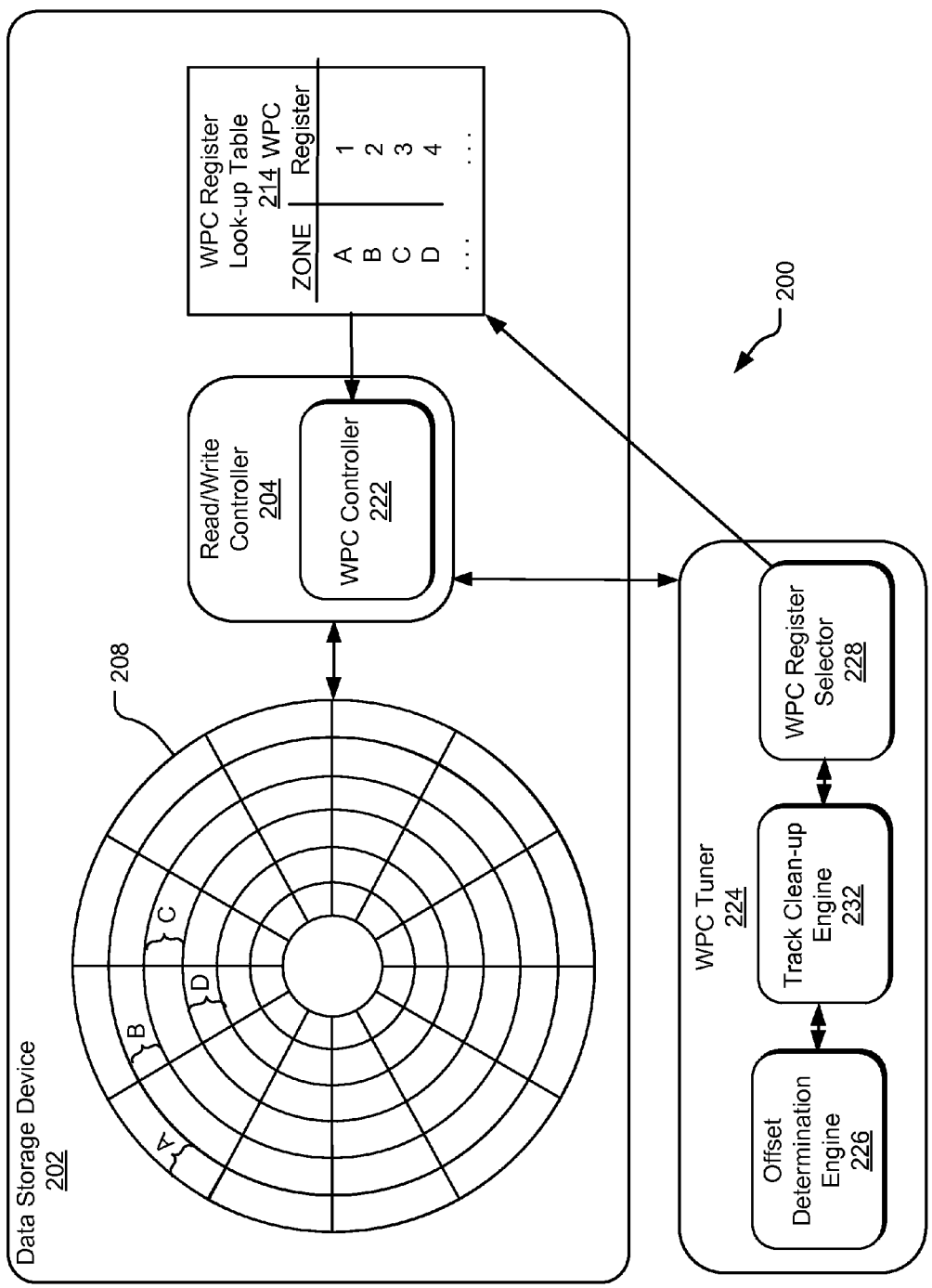
FIG. 2 illustrates an example system for performing write precompensation (WPC) tuning of a storage device.

FIG. 2 illustrates an example system 200 for performing WPC tuning of a data storage device 202. According to one implementation, the data storage device 202 is a shingled magnetic recording (SMR) device. The data storage device 202 includes at least a read/write controller 204 that executes read and write operations to a storage medium 208. According to one implementation, the read/write controller 204 collaborates with a WPC controller 222 to lookup and implement timing shifts for each write transition of each write command.

The WPC controller 222 accesses a look-up table 214 or other data storage to identify which of a number of selectable WPC registers to use when writing data of each incoming write command. Each of the selectable WPC registers stores a number of pattern-dependent timing shifts. In the example of FIG. 2, a different WPC register is used to implement write precompensation timing shifts in each of the radial zones A, B, C, and D.

In one implementation, the read/write controller 204 provides the WPC controller 222 with a target logical block address (LBA) or radial zone (e.g., radial zones A, B, C, etc.) of a target write location. Using this information, the WPC controller 222 identifies a corresponding WPC register in the WPC register look-up table 214. If, for example, an incoming write command is directed to the radial zone "C," the WPC controller 222 identifies 'WPC register 3' as the corresponding WPC register for implementing timing shifts for the write command.

During a factory formatting process, a WPC tuner 224 selects one of the selectable WPC registers to use in association with each of the different radial zones on the storage medium 208. For example, the WPC tuner 224 initially creates the WPC register look-up table 214 during WPC tuning and saves the WPC register look-up table 214 in a memory location accessible to the WPC controller 222 throughout a lifetime of the data storage device 202.

To match the various radial zones of the storage medium 208 with the 'best' one of the selectable WPC registers, the WPC tuner 224 tests each of the selectable WPC registers on each of the different radial zones. Prior to actual testing of the WPC registers on the various radial zones, an offset determination engine 226 of the WPC tuner 224 performs a series of operations to identify a track clean-up write offset in association with each of the radial zones. The track clean-up write offset corresponds to an offset from the center of a test data track for writing a data pattern to mitigate remnant noise near boundaries of the data track. Example operations of the offset determination engine are described in greater detail with respect to FIGS. 3-5 below.

During WPC tuning by the WPC register selector 228, a track clean-up engine 232 writes a predetermined pattern (such as a 1T pattern) at positions of +/−the track clean-up write offset from a test data track to mitigate noise near boundaries of the data track prior to testing each of the selectable WPC registers. This noise mitigation allows for more accurate WPC register selection by the WPC register selector 228. During register selection (e.g., WPC tuning), the WPC register selector 228 populates the WPC register look-up table 214 with the selected WPC registers for subsequent use by the WPC controller 222.

Some or all aspects of the WPC tuner 224 may be implemented by software and/or firmware of the data storage device 202 and/or implemented within an external computing device communicatively coupled to the data storage device 202 during factory calibrations (e.g., WPC tuning) The read/write controller 204 and/or the WPC tuner 224 may comprise hardware and/or software implemented in a tangible computer-readable storage media readable by a computing node within or communicatively coupled to the mass data storage system. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism.

Figure 3:
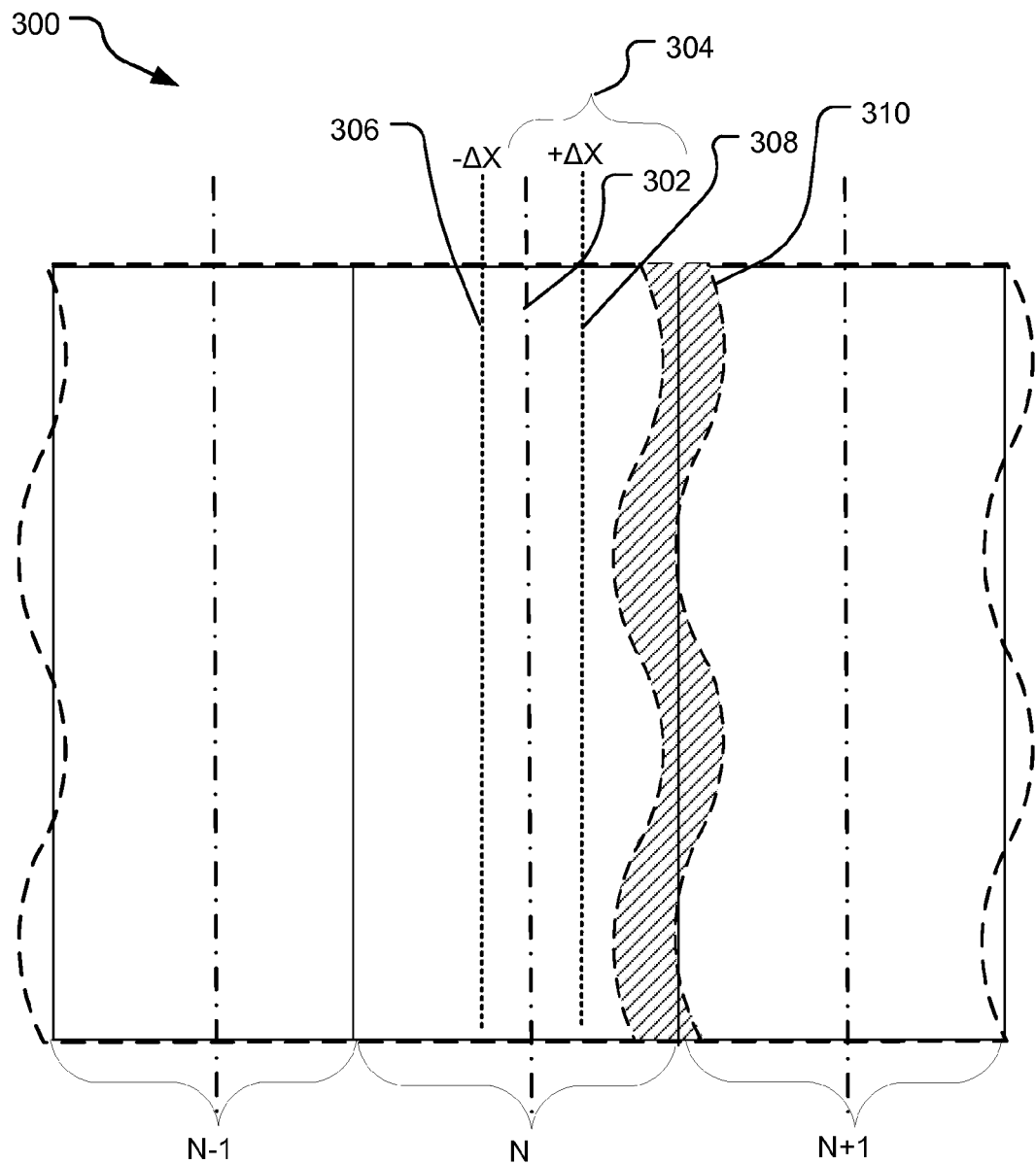
FIG. 3 illustrates example operations for selecting a radial offset to use in a track-clean-up phase of WPC tuning for a specified radial zone on a storage medium.

FIG. 3 illustrates example data writes to a magnetic medium 300 for selecting a track clean-up write offset for use in a track clean-up phase of WPC tuning of a storage device. In one implementation, the example data writes are performed by an offset determination engine, such as the offset determination engine 226 of FIG. 2). The offset determination engine selects a test data track (N), writes a random pattern along the center of the test data track (N) (at a position indicated by dotted line 302), and also defines a range 304 of potential offsets from a center of the test data track (N). The offset determination engine further selects an offset (ΔX) from within the range 304 and writes a single bit transition pattern (a 1T pattern) at the select offset (ΔX) on both sides of the test data track (N) (e.g., in positions indicated by dotted lines 306 and 308 in FIG. 3). If, for example, the test offset is 20% of a defined track width, the offset determination engine writes the 1T pattern positions defined by: $N_{center}+20\%$ (track width) and $N_{center}-20\%$ (track width) where $N_{center}$ is the center of track N.

After writing the 1T pattern at the positions $N_{center}+\Delta X$ and $N_{center}-\Delta X$, the offset determination engine writes a random pattern along the data track N and subsequent write another random pattern along a data track (N+1) to simulate a condition of remnant noise 310 caused by data writes to adjacent shingled data tracks (e.g., a SMR data write). After writing the random pattern to the data track N+1, the offset determination engine reads back the random pattern from data track N and determines a corresponding bit error rate.

In one implementation, the above-described data writes are repeated multiple times for the same test offset to determine a standard deviation in the bit error rate (e.g., a "BER standard deviation") associated with the select offset (ΔX). This BER standard deviation determination process is then repeated for each of a number of other potential offsets, and the offset determination engine ultimately saves a BER standard deviation in association with each tested offset.

Figure 4:
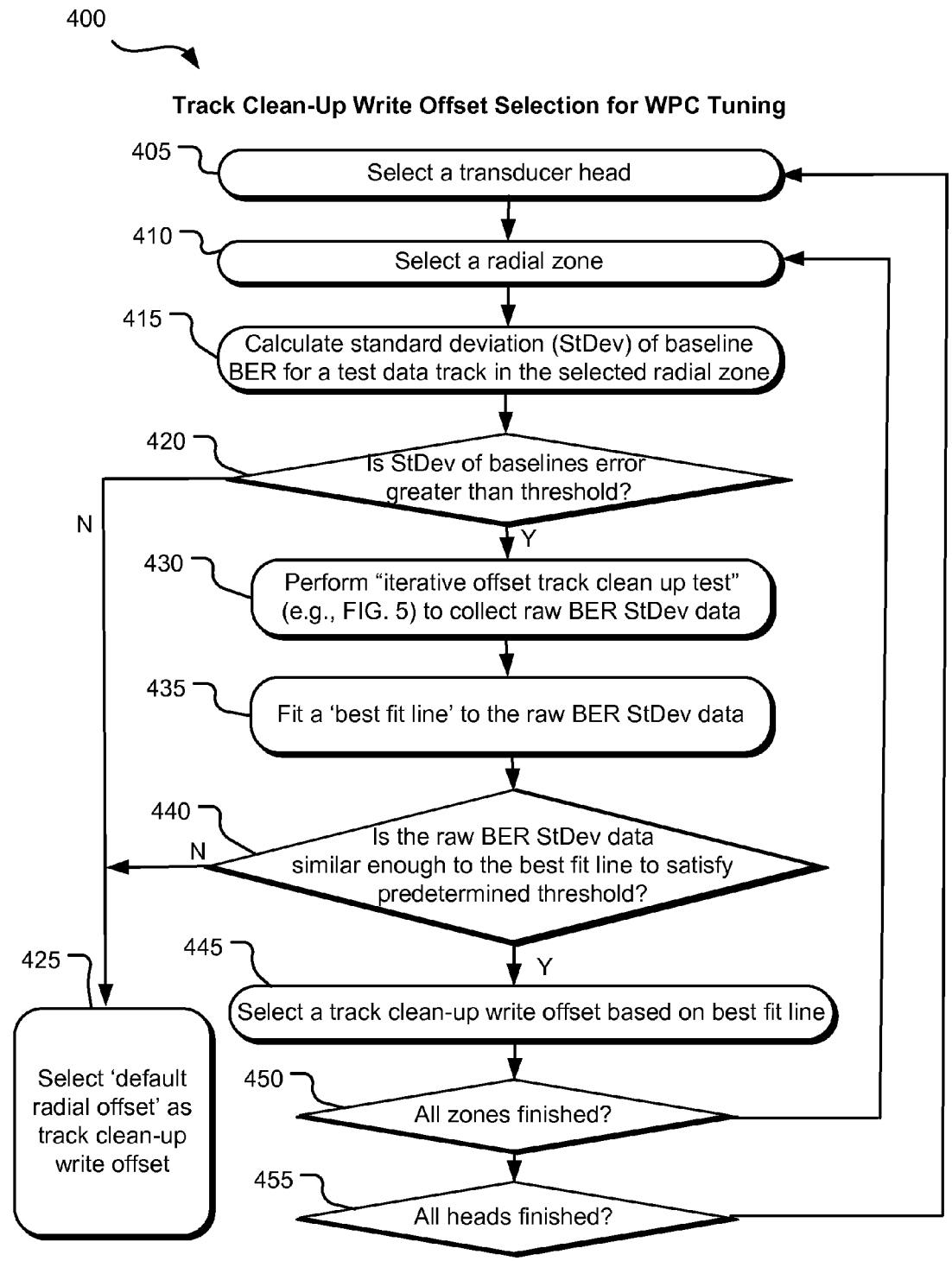
FIG. 4 illustrates example operations for selecting of track clean-up offsets for use in WPC tuning of a storage device.

FIG. 4 illustrates example operations 400 for selecting clean-up write offsets for use in a clean-up phase of WPC tuning of a storage device. Specifically, the operations 400 provide for selection of a "track clean-up write offset" for each radial zone on a shingled magnetic recording media. A selection operation 405 selects a transducer head on storage device. Another selection operation 410 selects a radial zone on the storage medium. A calculation operation 415 calculates a baseline BER standard deviation for a test data track in the selected radial zone. In one implementation, the calculation operation 415 entails repeating a series of data writes to and reads from the test data track and calculating the BER standard deviation based on the cumulative BER calculations, A determination operation 420 determines whether the baseline BER standard deviation for the test data track is greater than a predetermined threshold. If the baseline BER standard deviation for the test data track is not greater than a predetermined threshold, a default offset selection operation 425 selects a default write offset as the track clean-up write offset for subsequent WPC tuning of the select radial zone (with the select write head). In one implementation, the default write offset is +/−25% from the center of the test data track.

If, however, the determination operation 420 determines that the baseline BER standard deviation for the test data track is greater than the predetermined threshold, a performing operation 430 performs an iterative offset track clean-up (e.g., the "iterative offset track clean-up" of FIG. 5, described below) on the test data track. The term "iterative offset track clean-up" refers to a series of operations where a predetermined data pattern is written at each of a number of offsets on both sides of the test data track N, and an effect on noise mitigation is measured in association with each offset. In performing the iterative offset track clean-up (e.g., operations of FIG. 5, below) the performing operation 430 generates raw BER standard deviation data relating to data writes and reads of the test data track in association with each offset.

A fitting operation 435 fits a 'best fit line' (e.g., a second degree polynomial) to the raw BER standard deviation data (e.g., y=BER standard deviation, x=offset), and a determination operation 440 determines whether the raw BER standard deviation data is similar enough to the best fit line to satisfy a predetermined threshold. If the raw BER standard deviation data is not similar enough to the best fit line to satisfy the threshold, the selection operation 425 selects the default radial offset as the track clean-up write offset for subsequent WPC tuning of the select radial zone. In one implementation, the default radial offset is selected when the determination operation 440 determines that an $R^2$ comparison between the raw BER standard deviation data and the best fit line yields an $R^2$ value less than 0.8. In alternative implementation higher or lower $R^2$ values may be used to select the default radial offset. Note that while in the illustrated implementation, the fitting operation 435 fits "best fit line" to the raw BER standard deviation data, in an alternative implementation, the fitting operation 435 may fit another line substantially close to the "best fit line" to the raw BER standard deviation data.

If, however, the raw BER standard deviation data from the iterative offset track clean-up is sufficiently similar to the best fit line, the default radial offset is not selected as the track clean-up write offset. In one implementation, the determination operation 440 determines that the $R^2$ comparison is greater than 0.8, and the default radial offset is not selected. Rather, a selection operation 445 selects the track clean-up write offset based on the best fit line. For example, the selection operation 445 may select an offset corresponding to an absolute minimum on the best fit line as the track clean-up write offset for WPC tuning of the select radial zone.

After selection of the track clean-up write offset for the select radial zone, a determination operation 450 determines whether other radial zones remain to undergo the operations 410-445. If other radial zones remain, the operations 410-445 are repeated for each of the remaining radial zones, selecting a track clean-up write offset for each different radial zone. After a track clean-up write offset is selected in association with each radial zone for the select transducer head, a determination operation 455 determines whether there are any additional transducer heads in the storage device. If any other transducer heads remain, the selection operation 405 selects another transducer head, and the operations 410-450 repeat for each of the remaining transducer heads.

Figure 5:
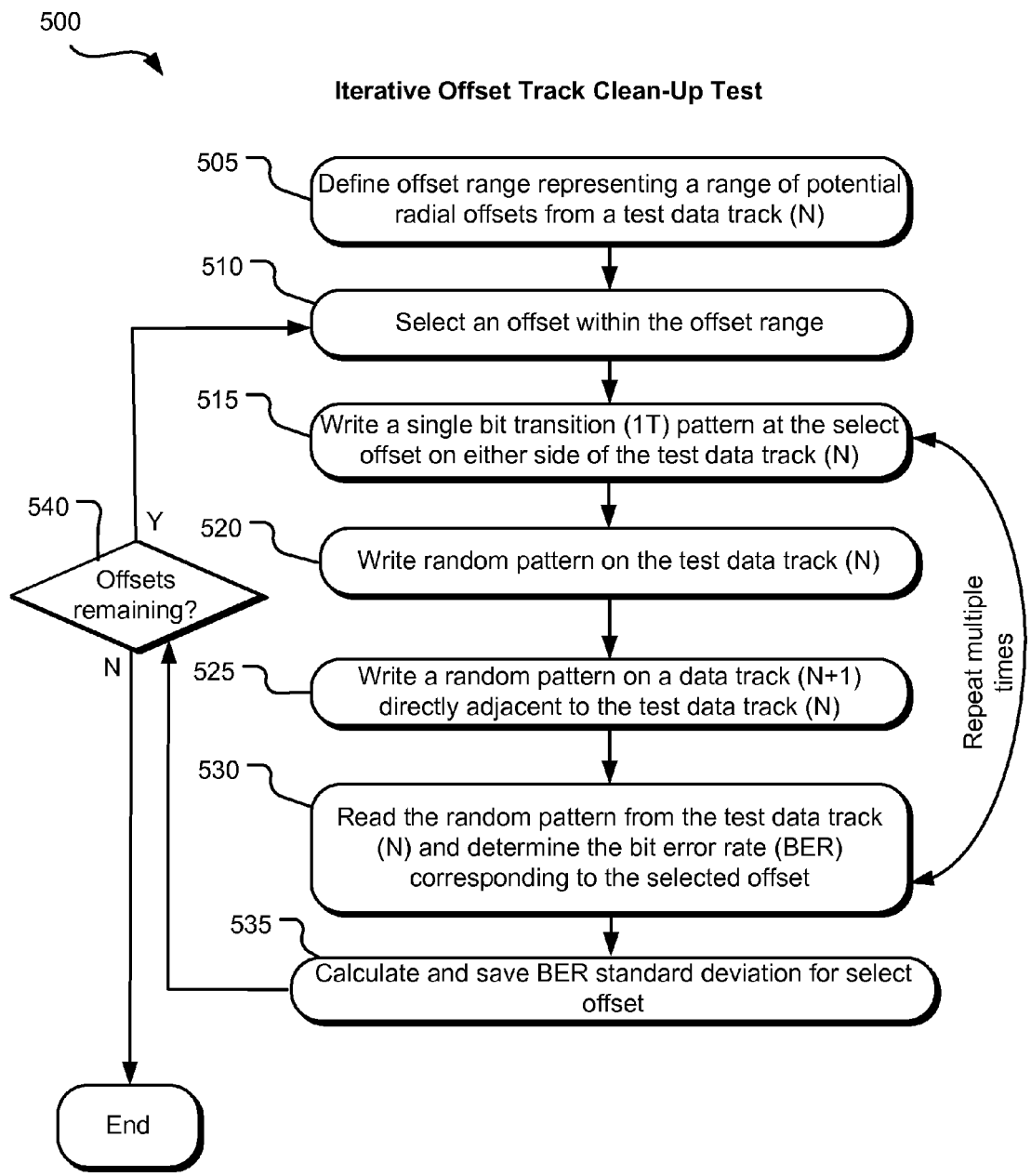
FIG. 5 illustrates example operations for performing an iterative offset track clean-up to test various offsets for noise mitigation purposes.

FIG. 5 illustrates example operations 500 for performing an iterative offset track clean-up to test various offsets for noise mitigation purposes. In one implementation, the iterative offset track clean-up is performed by an offset determination engine (e.g., the offset determination engine 226 of FIG. 2).

During the iterative offset track clean-up, a defining operation 505 first defines an offset range representing a range of potential radial offsets from a test data track N. For example, the offset range may be 0~+100%. A selection operation 510 selects an offset within the defined offset range. A write operation 515 writes a single bit transition (1T) pattern at the selected offset on either side of a center of the test data track N, and another write operation 520 writes a random pattern on the test track N. Subsequently, another write operation 525 writes a random pattern on a data track (N+1) directly adjacent to the test data track N.

A read operation 530 reads the random pattern written to the test data track N and determines a bit error rate (BER) for the write operation 530. In one implementation, the operations 515-530 are repeated a number of times in association with a same select offset (e.g., via the selection operation 510) so that a calculation operation 535 may calculate a standard BER standard deviation in association with the select offset and test data track N. For example, operations 515-530 are repeated 20 times for the selected offset, and a BER standard deviation is saved in conjunction with the select offset and test data track N.

A determination operation 540 determines whether there are any offsets within the defined offset range remaining to be tested. If other offsets remain to be tested, the operations 510-535 repeat until raw BER standard deviation data has been collected for each of a number of predetermined offsets within the defined offset range. During subsequent operations (e.g., operations 435, 440 of FIG. 4), this raw BER standard deviation data is used to select a track clean-up write offset for use during a track clean-up phase of WPC tuning of a radial zone including the test data track N.

Figure 6:
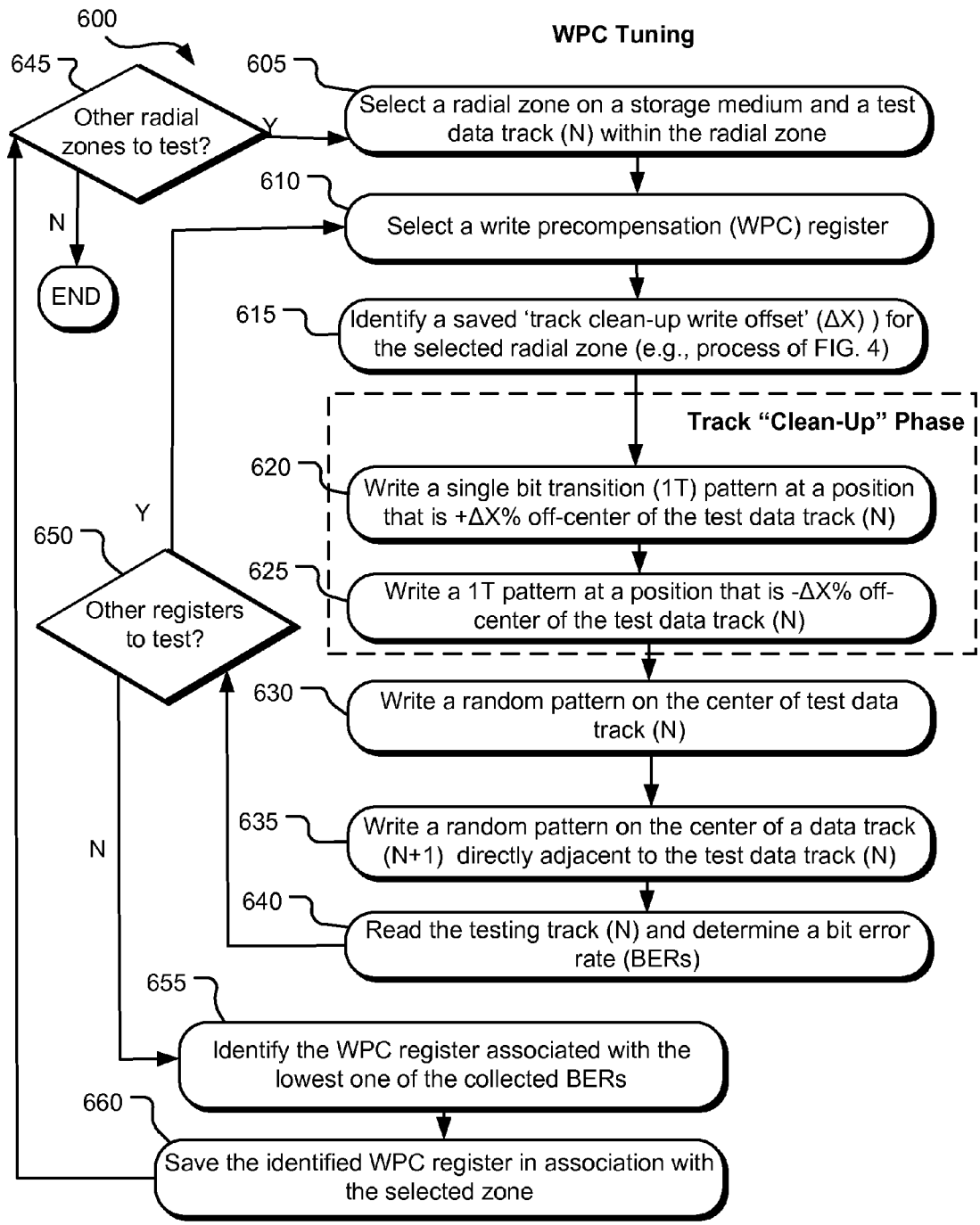
FIG. 6 illustrates example operations for a WPC tuning process that selects a WPC register to provide write transition timing shifts for data writes to a specific radial zone on a magnetic recording device.

FIG. 6 illustrates example operations 600 for WPC tuning of a storage device. During WPC tuning, a WPC register is selected for use in association with each of a number of radial zones on the storage device. A selection operation 605 selects a radial zone on a storage medium and a testing track N within the selected radial zone. Another selection operation 610 selects one of a number of selectable WPC registers for testing in the selected radial zone. Each WPC register defines a series of pattern-specific timing adjustments.

An identification operation 615 identifies a track clean-up write offset ($\Delta X$) saved in association with the select radial zone, such as the track clean-up write offset selected via the operations 425 or 450 described with respect to FIG. 4.

Writes operations 620 and 625 collectively represent a track clean-up phase of WPC tuning that prepares a test data track N for testing of the select WPC register. During the track clean-up phase, a first write operation 620 writes a single bit transition (1T) pattern to a position that is $+\Delta X$ % off-center of the test data track N. A second write operation 625 writes a 1T pattern at a position that is $-\Delta X$ % off-center of the test data track N. A third write operation 630 writes a random pattern on the center of the test track N.

To simulate remnant noise near data track boundaries after a series of data writes in an SMR drive, a fourth write operation 635 writes a random pattern on the center of a data track N+1 directly adjacent to the test data track N. A reading and determination operation 640 reads back the random pattern from the test data track N and determines a BER of the write operation.

A determination operation 650 determines if there are any other WPC registers to test in association with the selected radial zone. The number of WPC registers tested in association with each of the radial zones varies in different implementations. In one example implementation, about four data patterns are tested in association with each radial zone. If other WPC registers remain to be tested, the selection operation 610 selects another WPC register, and the operations 615-640 repeat to determine a BER associated with each newly-selected WPC register.

Once all WPC registers are tested in the select radial zone via the operations 615-640, an identification operation 655 identifies the WPC register corresponding to the lowest BER of the BERs collected by the reading and determination operation 640. A saving operation 660 saves the identified WPC register in association with the select radial zone for use in writing data to the select radial zone during the lifetime of the storage device.

After a WPC register is saved in association with the selected radial zone via the saving operation 660, a determination operation 645 determines whether there are other radial zones for which WPC tuning has not yet been performed. The processes 605-660 repeat until a WPC register is selected and saved in association with each radial zone.

The implementations of the invention described herein are implemented as logical steps in one or more computer systems. The logical operations of the present invention are implements (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting operations as desired, unless explicitly claimed otherwise or a specific order is inherently necessitated by the claim language.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
writing a predetermined pattern at different radial offsets from a target data track in a data storage device; and
identifying a radial offset where a data write of the predetermined pattern provides substantially highest mitigation of fluctuation in a bit error rate for subsequent data reads of the target data track.

2. The method of claim 1, wherein the predetermined pattern is a single-bit transition pattern.

3. The method of claim 1, further comprising:
cleaning the target data track by writing the predetermined pattern at an offset corresponding to the identified radial offset on both sides of the target data track;
testing a write precompensation register in association with the target data track after the cleaning of the target data track.

4. The method of claim 3, wherein testing the write precompensation register further comprises:
writing a random pattern along the cleaned target data track and along a data track directly adjacent to the cleaned target data track according to one or more timing delays specified by the write precompensation register;
reading the random pattern from the cleaned target data track; and
determining a bit error rate of the read operation.

5. The method of claim 1, wherein writing the predetermined data pattern at each of the different radial offsets further comprises:
writing the predetermined data pattern at a select one of the radial offsets;
writing a random pattern along the target data track;
writing a random pattern along a data track directly adjacent to the target data track;
reading the random pattern from the target data track; and
measuring a bit error rate of the read operation.

6. The method of claim 1, wherein a storage medium of the storage device is a shingled magnetic storage medium.

7. A system comprising:
at least one processor;
a memory; and
an offset determination engine stored in the memory and executable by the at least one processor, the offset determination engine configured to write a predetermined pattern at different radial offsets from a target data track on a storage medium to identify a radial offset where a data write of the predetermined pattern provides substantially highest mitigation of fluctuation in a bit error rate for subsequent data reads of the target data track.

8. The system of claim 7, further comprising:
a track clean-up engine stored in the memory and executable by the at least one processor, the track clean-up engine configured to clean the target data track by writing the predetermined pattern at an offset corresponding to the identified radial offset.

9. The system of claim 8, further comprising:
a write precompensation register selector stored in memory and executable by the at least one processor, the write precompensation register selector configured to test a write precompensation register in association with the cleaned target data track storing the predefined pattern at the identified radial offset.

10. The system of claim 8, wherein the track clean-up engine writes the predetermined pattern at the identified radial offset following each test of a different write precompensation register.

11. The system of claim 9, wherein the write precompensation register selector saves, in a storage device memory, a substantially optimal write precompensation register in association with a radial zone including the target data track.

12. The system of claim 9, wherein the write precompensation register selector is configured to test the write precompensation register by:
writing a random pattern along the cleaned target data track and along a data track directly adjacent to the target data track according to at least one timing delay specified by the write precompensation register;
reading the random pattern from the target data track; and
determining a bit error rate of the read data.

13. The system of claim 7, wherein the predetermined pattern is a single-bit transition pattern.

14. The system of claim 7, wherein the offset determination engine is configured to write the predetermined pattern at each of the different radial offsets by:
writing the predetermined data pattern at a select one of the radial offsets;
writing a random pattern along the target data track;
writing a random pattern along a data track directly adjacent to the target data track;
reading the random pattern from the target data track; and
measuring a bit error rate of the read operation.

15. The system of claim 7, wherein the storage medium is a shingled magnetic storage medium.

16. A method comprising:
writing a predetermined pattern at a number of radial offsets from a target data track in a data storage device;
selecting one of the radial offsets; and
writing the predetermined pattern at the selected radial offset before testing accuracy of a write precompensation register for use in association with the target data track.

17. The method of claim 16, wherein a bit error rate fluctuation for data reads of the target data track is mitigated when the predetermined pattern is written at the selected radial offset prior to each data write to the target data track.

18. The method of claim 16, wherein the predetermined pattern is a single bit transition pattern.

19. The method of claim 16, wherein the selecting of one of the radial offsets further comprises:
writing a predetermined pattern at a one of the radial offsets from the target data track;
writing a random pattern along the target data track;
writing a random pattern along a data track directly adjacent to the target data track;
reading the random pattern from the target data track; and
determining a bit error rate of the read data.

20. The method of claim 16, wherein the data storage device is a shingled magnetic recording device.

* * * * *